US008066373B2

(12) United States Patent
Blum et al.

(10) Patent No.: US 8,066,373 B2
(45) Date of Patent: Nov. 29, 2011

(54) MULTIFOCAL MEASUREMENT DEVICE (75) Inventors: Ronald D. Blum, Roanoke, VA (US); Tony Van Heugten, Sarasota, FL (US)

(73) Assignee: PixelOptics, Inc., Roanoke, VA (US)

( * ) Notice: Subject to any disclaimer, the term of this patent is extended or adjusted under 35 U.S.C. 154(b) by 0 days.

(21) Appl. No.: 12/698,608

(22) Filed: Feb. 2, 2010

(65) Prior Publication Data

US 2010/0195046 A1   Aug. 5, 2010

Related U.S. Application Data (60) Provisional application No. 61/149,410, filed on Feb. 3, 2009, provisional application No. 61/170,693, filed on Apr. 20, 2009, provisional application No. 61/173,356, filed on Apr. 28, 2009, provisional application No. 61/187,854, filed on Jun. 17, 2009.

(51) Int. Cl.
*A61B 3/10* (2006.01)
(52) U.S. Cl. .......................... 351/204; 351/246
(58) Field of Classification Search .................. 351/200, 351/204, 246
See application file for complete search history.

(56) References Cited

U.S. PATENT DOCUMENTS

| 4,252,419 | A | * | 2/1981 | Padula et al. | 351/204 |
|---|---|---|---|---|---|
| 4,368,958 | A | * | 1/1983 | Buget | 351/204 |
| 4,531,297 | A | * | 7/1985 | Stoerr | 33/200 |
| 5,406,341 | A | | 4/1995 | Blum | |
| 5,598,234 | A | | 1/1997 | Blum | |
| 5,640,219 | A | | 6/1997 | Ramachandran | |
| 6,229,595 | B1 | | 5/2001 | McKinley | |
| 7,296,357 | B2 | | 11/2007 | Katzman | |
| 2005/0094096 | A1 | | 5/2005 | Menezes | |

FOREIGN PATENT DOCUMENTS

| EP | 1256311 | 11/2002 |
|---|---|---|
| EP | 1637067 | 11/2008 |
| JP | 08098810 | 4/1996 |

OTHER PUBLICATIONS

"My Styler Instructions" brochure. Applicant became aware of this reference around Jun. 2009.
Photograph of device. Applicant became aware of this reference around Jun. 2009.
"Shamir's Panorameter Kit Simplifies Measuring Tasks", Vision Monday, San Diego, California, Jul. 20, 2009.
Shamir's Panorameter. Applicant became aware of this reference around Jul. 2009.

* cited by examiner

*Primary Examiner* — Huy K Mai
(74) *Attorney, Agent, or Firm* — Kilpatrick Townsend & Stockton LLP (57) ABSTRACT

Aspects of the present invention provide apparatuses and methods for conducting pupil height measurements. A multifocal measurement device of the present invention can comprise a base member and first and second adjustable measurement members. The multifocal measurement device can be connected to eyeglasses worn by a patient. A first knob can be used to adjust a vertical positioning of the first adjustable measurement member and a second knob can be used to adjust a vertical positioning of the second adjustable measurement member. The adjustable measurement members can each comprise pupillary alignment reference areas—such as transparent lines, opaque lines, or prisms—that can be positioned substantially in front of the pupils of the patient by adjusting the knobs. Pupil height measurements can subsequently be made by measuring the distances between the first and second pupillary alignment reference areas and the bottom of the eyeglasses worn by the patient.

28 Claims, 10 Drawing Sheets

MULTIFOCAL MEASUREMENT DEVICE

CROSS-REFERENCE TO RELATED APPLICATIONS

This application claims priority from and incorporates by reference in their entirety the following provisional applications:
U.S. Appl. No. 61/149,410, filed on Feb. 3, 2009;
U.S. Appl. No. 61/170,693, filed on Apr. 20, 2009;
U.S. Appl. No. 61/173,356, filed on Apr. 28, 2009; and
U.S. Appl. No. 61/187,854, filed on Jun. 17, 2009.

BACKGROUND OF THE INVENTION

1. Field of the Invention

The present invention generally relates to pupil height measurements.

More specifically, the present invention provides apparatuses and methods for conducting pupil height measurements in a more efficient and accurate manner.

2. Background Art

Pupil height measurements are often conducted when an individual is being fitted for multifocal eyeglasses (e.g., frames with progressive lenses or frames with bifocal or trifocal lenses). The pupil height measurements can be used to ensure that the multifocal region (e.g., the add region) of the lenses to be worn by the wearer are positioned correctly within the patient's eyeglass frames. Without an accurate pupil height or fitting height measurement, the multifocal region can be positioned incorrectly.

For example, if the multifocal region is fit too low within the patient's eyeglass frames, then the patient may be required to tilt her head up in an undesirable manner in order to use the multifocal region (e.g., the near vision area) of the lens. If the multifocal region is fit too high within the patient's frames, then the patient may be required to tilt her head down in an undesirable manner in order to use the distance region.

Conventional pupil height measurement devices are bulky, clumsy to use, and are prone to error. Further, conventional methods for conducting pupil height measurements are often inaccurate. Accordingly, what is needed is a pupil height, fitting height or multifocal measurement device and method of use that can improve the speed and accuracy of pupil height measurements while being small, low cost and easy to use.

SUMMARY OF THE INVENTION

A multifocal measuring device is provided. The multifocal measuring device comprises a base member and any one of, or some combination of, a bubble level, an accelerometer, and a gyroscope. The multifocal measuring device also comprises a first adjustable measurement member connected to the base member and oriented substantially perpendicular to the base member. A first knob protrudes from a first end of the base member and adjusts a vertical positioning of the first adjustable measurement member relative to the base member. The multifocal measuring device also comprises a second adjustable measurement member connected to the base member and oriented substantially perpendicular to the base member and substantially parallel to the first adjustable measurement member. A second knob protrudes from a second end of the base member and adjusts a vertical positioning of the second adjustable measurement member relative to the base member. The first adjustable measurement member further comprises a first pupillary alignment reference area that can be positioned substantially in front of a first pupil of an individual by adjusting the first knob. The second adjustable measurement member further comprises a second pupillary alignment reference area that can be positioned substantially in front of a second pupil of the individual by adjusting the second knob.

A method for measuring a pupil height of an individual is also provided. The method comprises positioning eyeglasses on the individual and attaching a multifocal measurement device across a top of the eyeglasses, wherein the multifocal measurement device comprises an adjustable vertical member. The adjustable vertical member comprises a pupillary alignment reference area. The method further comprises determining a measurement head position of the patient by adjusting a bubble level connected to the multifocal measurement device to indicate the head position. The vertical position of the adjustable vertical member is adjusted so as to position the pupillary reference alignment area substantially in front of a pupil of the individual. A distance between the pupillary reference alignment area and a bottom of the eyeglasses is measured.

An ophthalmic measuring device for locating a reference point positioned within a pupil of a first eye of an individual is also provided. The device comprises means for attaching the ophthalmic measuring device to an eyeglass frame worn by the individual and means for determining a measurement head position of the patient. The device further comprises a first moveable member positioned in front of the first eye for measuring a distance from the reference point to a bottom of an eyeglass rim of the eyeglass frame worn by the individual. The moveable member comprises a scale for measuring the distance.

A multifocal measuring device is also provided the comprises a base member and any one of, or some combination of, a bubble level, an accelerometer, and a gyroscope coupled to the base member. The multifocal measuring device further comprises a first adjustable measurement member connected to the base member and oriented substantially perpendicular to the base member and a second adjustable measurement member connected to the base member and oriented substantially perpendicular to the base member and substantially parallel to the first adjustable measurement member. The first adjustable measurement member comprises a first pupillary alignment reference area that can be positioned substantially in front of a first pupil of an individual and the second adjustable measurement member comprises a second pupillary alignment reference area that can be positioned substantially in front of a second pupil of the individual.

DETAILED DESCRIPTION OF THE INVENTION

Aspects of the present invention provide apparatuses and methods for conducting pupil height or fitting point measurements. A multifocal measurement device of the present invention can comprise a base member, a first adjustable measurement member connected to the base member, and a second adjustable measurement member connected to the base member. The first and second adjustable measurement members can be oriented substantially perpendicular to the base member and substantially parallel to one another.

The multifocal measurement device of the present invention can be connected to eyeglasses worn by a patient. A first knob protruding from a first end of the base member can be used to adjust a vertical positioning of the first adjustable measurement member relative to the base member. A second knob protruding from a second end of the base member can be used to adjust a vertical positioning of the second adjustable measurement member relative to the base member. The first adjustable measurement member can comprise a first pupillary alignment reference area that can be positioned substantially in front of a first pupil of the patient by adjusting the first knob. The second adjustable measurement member can also comprise a second pupillary alignment reference area that can be positioned substantially in front of a second pupil of the patient by adjusting the second knob. Pupil height measurements can subsequently be made by measuring the distances between the first and second pupillary alignment reference areas and the bottom of the eyeglasses worn by the patient. According to aspects of the present invention, the first and second pupillary alignment reference areas can each comprise a transparent slit or line, an opaque line, or a prismatic optical element.

Figure 1:
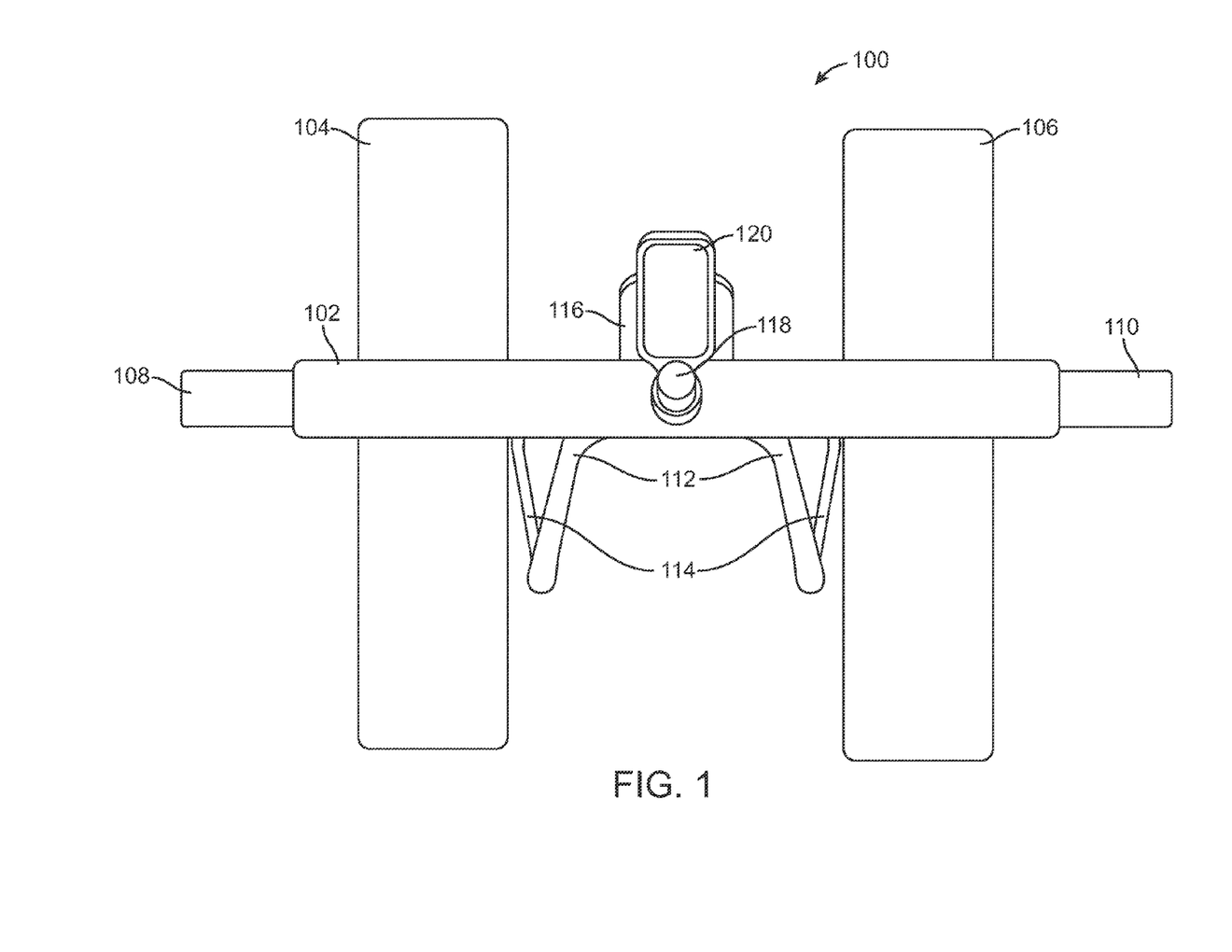
FIG. 1 illustrates a multifocal measurement device in accordance with an aspect of the present invention.

FIG. 1 illustrates a multifocal measurement device 100 in accordance with an aspect of the present invention. The multifocal measurement device 100 can be used to conduct fitting height (pupil height) measurements for an individual (e.g., a patient). To facilitate fitting height measurements for a patient, the multifocal measurement device 100 can be positioned on an eyeglass frame worn by the patient. Specifically, the multifocal measurement device 100 can be used to measure the patient's pupil height relative to a bottom of the eyeglass frame worn by the patient (or lenses if the eyeglass frames do not include a bottom eye wire or bottom frame front portion). The patient's pupil height can be measured relative to an approximate center of the patient's pupil (or other pupil reference point) and/or to the patient's line of sight (with the patient's line of sight typically being or approximately being the approximate center of the patient's pupil).

As shown in FIG. 1, the multifocal measurement device 100 can comprise a base member or support member 102. The base member 102 can house or support and can be attached, connected, or coupled to a first adjustable measurement member 104 and a second adjustable measurement member 106. As shown in FIG. 1, the first adjustable measurement member 104 and the second adjustable measurement member 106 are oriented substantially perpendicular to the base member 102 and substantially parallel to one another.

The first adjustable measurement member 104 can be moved in a vertical direction (i.e., up and down or perpendicular to the orientation of the base member 102). The first adjustable measurement member 102 can be used for measurements associated with the patient's right eye. The second adjustable measurement member 104 can also be moved in a vertical direction (i.e., up and down or perpendicular to the orientation of the base member 102). The second adjustable measurement member 106 can be used for measurements associated with the patient's left eye. Both the first and second adjustable measurement members 104 and 106 can include a pupillary alignment reference area (not shown in FIG. 1). The pupillary alignment reference area can be used to aid pupil height measurements by providing a reference on the adjustable measurement members that can be aligned with a patient's pupil (e.g., the approximate center or other reference point within the diameter of the pupil) and/or line of sight.

The first adjustable measurement member 104 can be moved by turning or adjusting a first knob 108. The first knob 108 can protrude from the base member 102 at a first end of the base member 102. The first knob 108 can be connected to an internal element of the base member 102 that is capable of moving and stabilizing the first adjustable measurement member 104. The second adjustable measurement member 106 can also be moved by turning or adjusting a second knob 110. The second knob 110 can protrude from the base member 102 at a second end of the base member 102. The second knob 110 can also be connected to an internal element of the base member 102 that is capable of moving and stabilizing the second adjustable measurement member 106. Both the first and second adjustable measurement members 104 and 106 can protrude from openings or ports provided on the top and bottom of the base member 102. In this way, the first and second adjustable measurement members 104 and 106 can "pass through" the base member 102 and can be moved independently.

As further shown in FIG. 1, the base member 100 can comprise front frame grips 112 and back frame grips 114. The front frame grips 112 can comprise two arms—a first or right side front arm and a second or left side front arm—that can be connected, coupled, or attached to the base member 102 (e.g., a front or bottom portion of the base member 102). The back frame grips 114 can also comprise two arms—a first or right side back arm and a second or left side back arm—that can be connected, coupled, or attached to the base member 102 (e.g., a back portion of the base member 102).

The front frame grips 112 and the back frame grips 114 can be used to connect, attach, or couple the multifocal measurement device 100 to an eyeglass frame. The front frame grips 112 can make contact with the front of an eyeglass frame (i.e., the front portion of an eyeglass frame further from a patient wearing the eyeglass frame). The back frame grips 114 can make contact with the back of the eyeglass frame (i.e., the back portion of the eyeglass frame closer to a patient wearing the eyeglass frame).

By using the front and back frame grips 112 and 114, the multifocal measuring device 102 can be connected, attached, clamped or coupled to any type of eyeglass frame (e.g., a fully-rimmed, partially-rimmed or rimless frame) and to any size of eyeglass frame (e.g., adult size or child size). According to an aspect of the present invention, the front frame grips 112 can be immobile or stationary and the back frame grips 114 can be moveable or adjustable. Specifically, the back frame grips 114 can be spring loaded to apply pressure to the front frame grips 112. A back frame grips actuator 116 can be used to move—e.g., open and close—the back frame grips 114.

By opening and closing the back frame grips 114, an eyeglass frame can be positioned between and removed from between the front and back frame grips 112 and 114. Positioning an eyeglass frame between the front and back frame grips 112 and 114 can enable the base member 102 to be positioned in a stable manner across the top of an eyeglass frame. The front and back frame grips 112 and 114 can make contact with the front and back of an eyeglass frame and/or front and back portions of lenses housed therein.

As an alternative to the back frame grips 114 being moveable, the front frame grips 112 can be moveable and adjustable (e.g., using an actuator) while the back frame grips 114 can be immobile or stationary. As a further alternative, both the front and back frame grips 112 and 114 can be moveable. Lastly, the movement of the front frame grips 112 and/or the back frame grips 114 can be accomplished manually (e.g., by direct movement of the grips without using an actuator).

Other mechanisms, other than or in addition to the front and back grips 112 and 114, can be used to attach or connect the multifocal measuring device 100 to eyeglasses as will be appreciated by one skilled in the pertinent art. For example, the multifocal measuring device 100 can include one or more hooks and/or one or more ledges to rest or attach the multifocal measuring device 100 across a top of a pair of eyeglasses.

Figure 10:
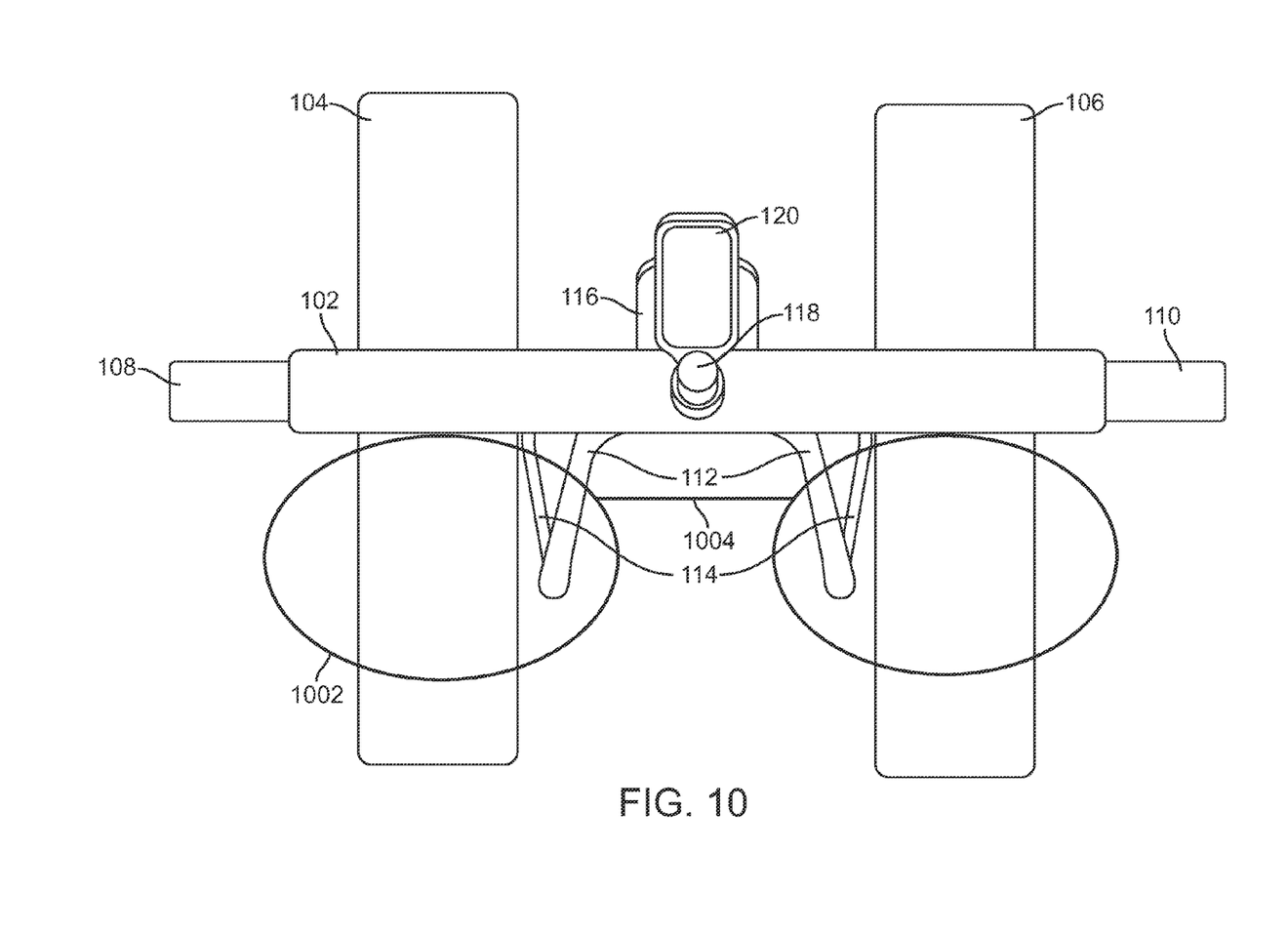
FIG. 10 illustrates the multifocal measurement device of FIG. 1 connected to an exemplary pair of eyeglasses in accordance with an aspect of the present invention.

FIG. 10 illustrates the multifocal measurement device 100 connected to an exemplary pair of eyeglasses in accordance with an aspect of the present invention. As shown in FIG. 10, eyeglasses 1002—comprising a right and a left lens and—bridge 1004—are positioned between the front and back frame grips 112 and 114. The multifocal measurement device 100 can be positioned across a top of the eyeglass frame 1002. The first adjustable measurement member 104 can be positioned hear a middle portion of the right lens of the eyeglass frame 1002. Similarly, the second adjustable measurement member 106 can be positioned near a middle portion of the left lens of the eyeglass frame 102. The front frame grips 112 can make contact with a front of the eyeglass frame 1002 (i.e., the portion of the eyeglass frame further from the patient) including the front of the right and left lenses. The back frame grips 114 can make contact with a back of the eyeglass frame 1002 (i.e., the portion of the eyeglass frame 1002 closer to the patient) including the back of the right and left lenses.

Returning to FIG. 1, the base member 102 of the multifocal measurement device 100 can be of any size, shape or dimension. The base member 102 can be made from any material including, but not limited to, plastic. Generally, the base member 102 can be thin and wide as depicted in FIG. 1. The first and second adjustable measurement members 104 and 106 can be of any size, shape or dimension. The first and second adjustable measurement members 104 and 106 can be made from any material including, but not limited to, plastic. The first and second adjustable members 104 and 106 can be made of a transparent material for example.

The first and second adjustable measurement members 104 and 106 can be spaced any distance apart. Generally, the first and second adjustable measurement members 104 and 106 can be spaced so that they are generally aligned with the typical spacing between the eyes of patients (e.g., as shown generally in FIG. 10). The first and second adjustable measurement members 104 and 106 can be spaced further apart for adult patients and can be spaced closer together for child patients. The first and second adjustable members 104 and 106 can be removed and replaced—for example, to replace broken members or to switch out the members for members designed for child use.

As further shown in FIG. 1, the multifocal measurement device 100 can comprise a level indicator 118. As an example, the level indicator 118 can be a bubble level. The level indicator 118 can be used to ensure that the head posture of the patient—wearing an eyeglass frame with the multifocal measurement device 100 attached—maintains a proper head angle for conducting pupil height measurements as will be described in more detail below. The multifocal measurement device 100 can also include a small reflective device or mirror 120. The mirror 120 can be used to better view the level indicator 118 when viewing the multifocal measurement device 100 straight on (e.g., as shown in FIG. 1).

Figure 2:
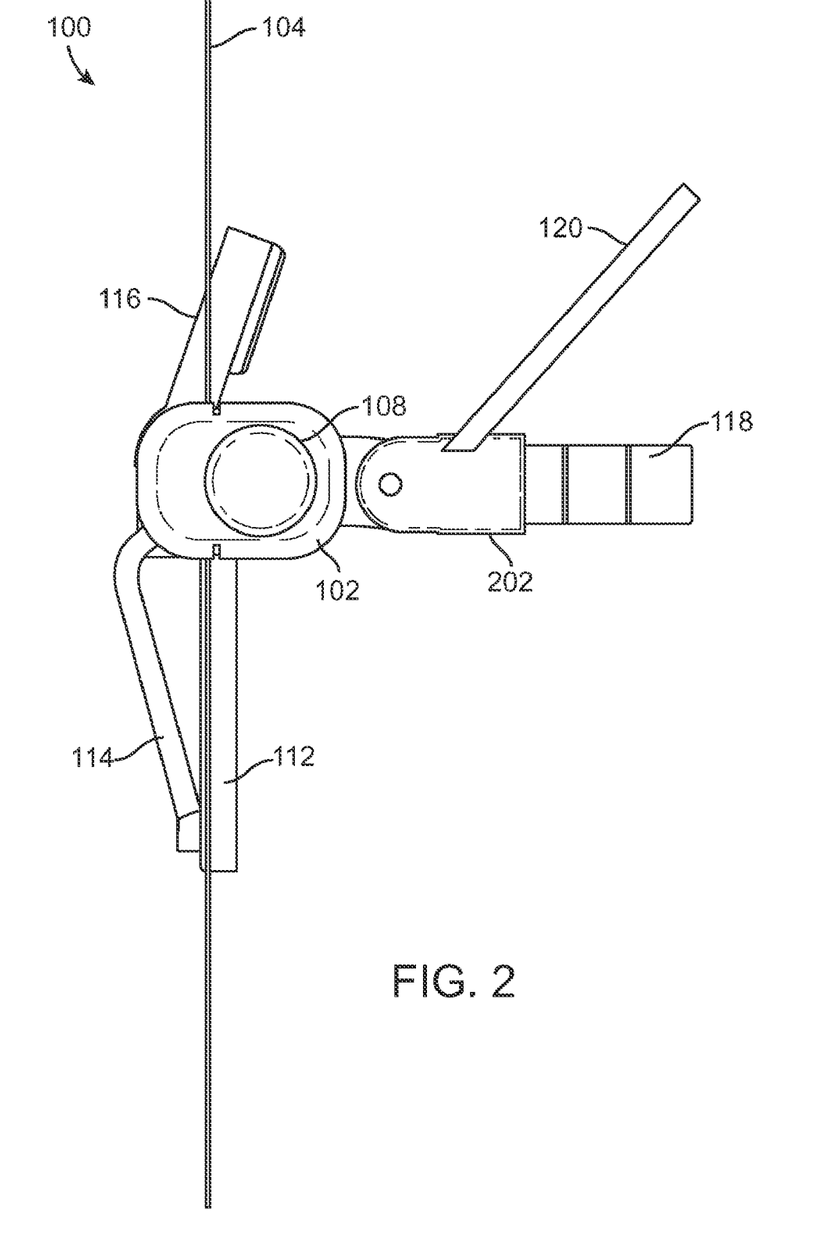
FIG. 2 illustrates a side view of the multifocal measurement device depicted in FIG. 1.

FIG. 2 illustrates a side view of the multifocal measurement device 100 in accordance with an aspect of the present invention. As shown in FIG. 2, the level indicator 118 and the mirror 120 can be connected or attached to a support member 202. The support member 202 can be connected, coupled or attached to a front of the base member 102. The support member 202 is shown to protrude in a substantially perpendicular manner relative to the base member 102 but is not so limited. Specifically, the support member 202 can protrude from the base member 102 in any direction or any angle—for example, at an angle such that the support member 202 is titled upwards relative to the base member 102. According to an aspect of the present invention, the support member 202 can be attached to the base member 102 using an adjustable swivel mount. Attaching the support member 202 to the base member 102 using an adjustable swivel mount enables the angle of the support member 202 to be adjusted and held in any desirable position.

Figure 3:
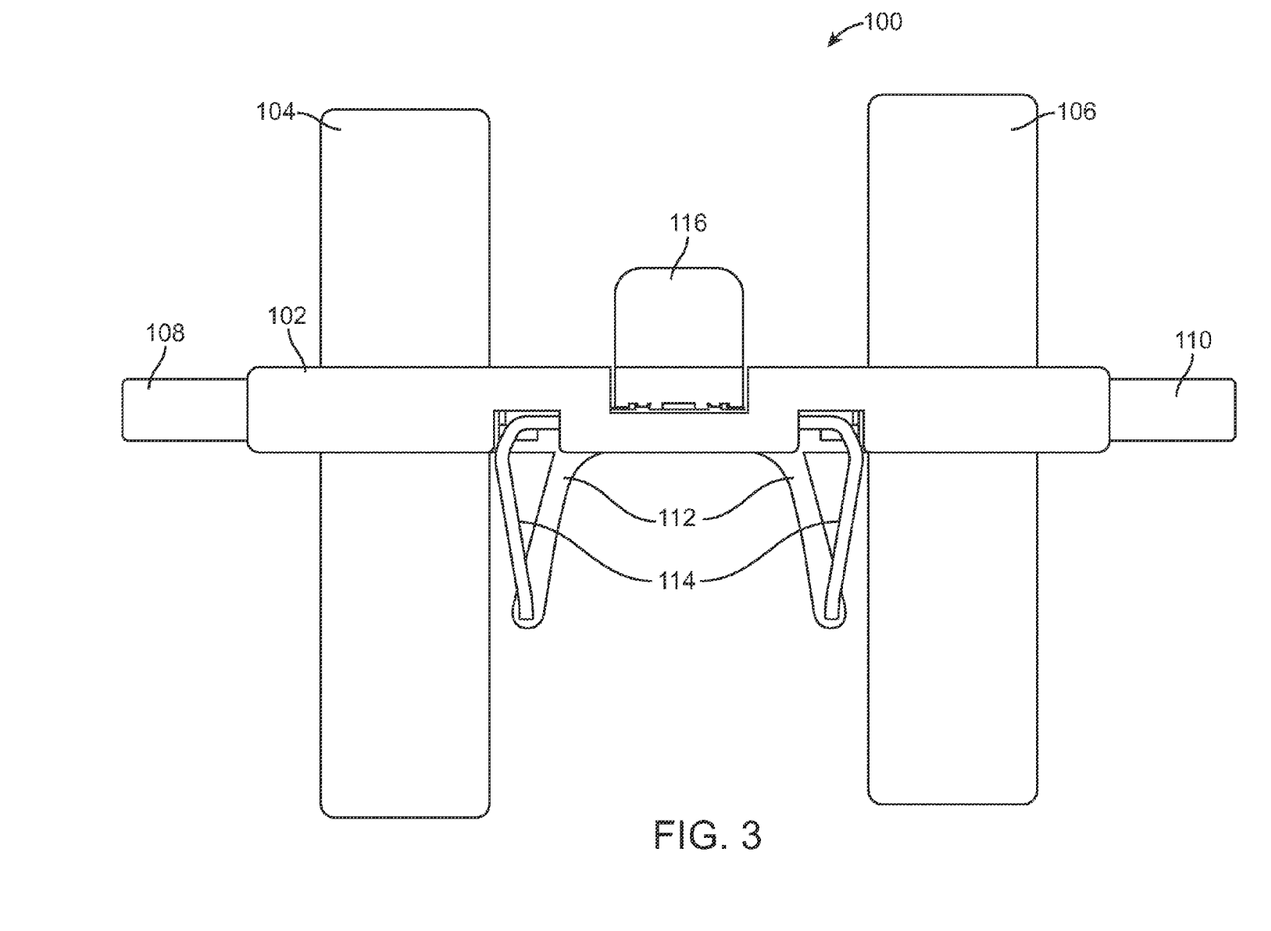
FIG. 3 illustrates a back view of the multifocal measurement device depicted in FIG. 1.

FIG. 3 illustrates a back view of the multifocal measurement device 100 in accordance with an aspect of the present invention. The view depicted in FIG. 3 can be the view of the multifocal measurement device 100 as seen by a patient wearing eyeglasses to which the multifocal measurement device 100 is attached. As shown in FIG. 3, the base member 102 can include an open space or port to enable the back frame grips 114 freedom to move when opening and closing.

Figure 4:
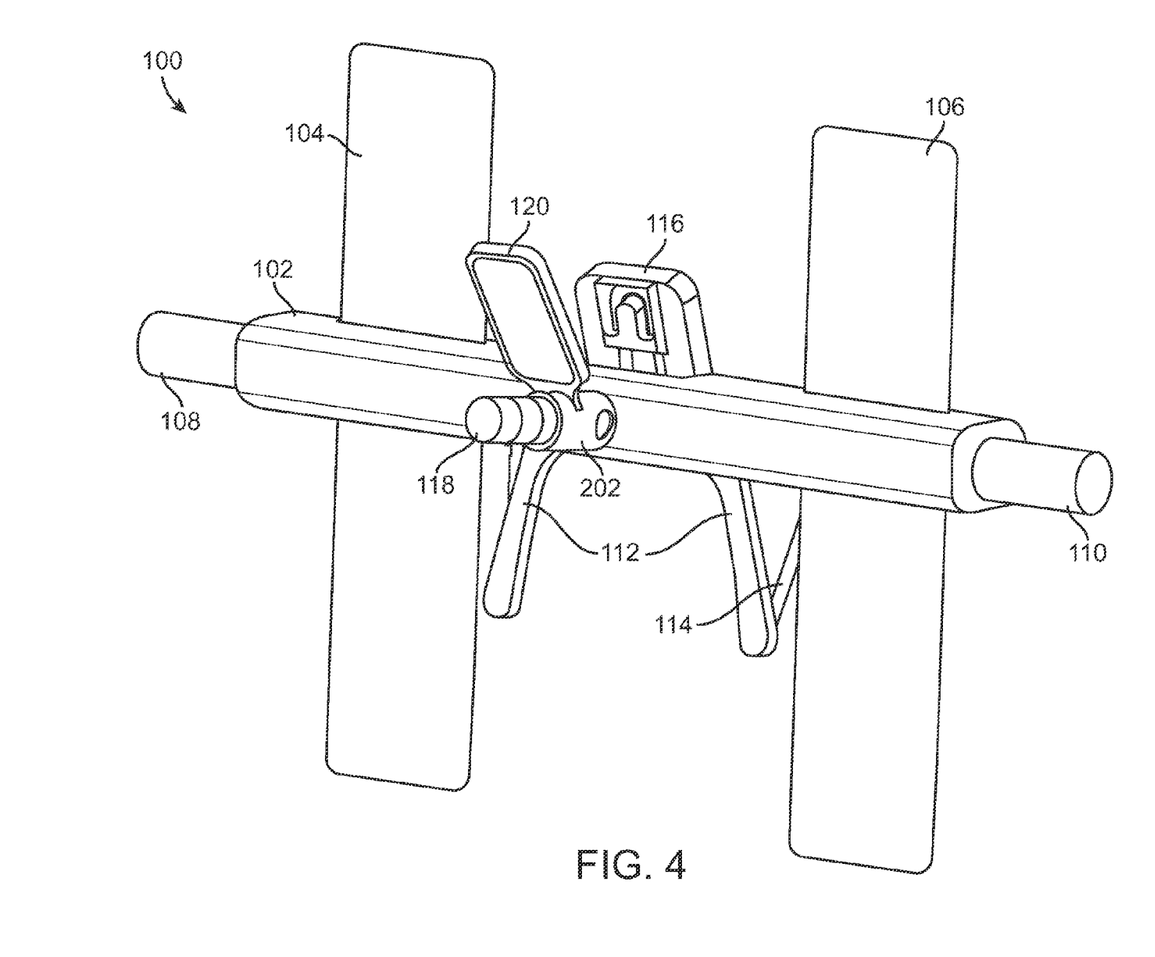
FIG. 4 illustrates a three dimensional view of the multifocal measurement device depicted in FIG. 1.

FIG. 4 illustrates a three dimensional view of the multifocal measurement device 100 in accordance with an aspect of the present invention. The orientation and positioning of the first and second adjustable measurement members 104 and 106 relative to the base member 102 is shown in FIG. 4.

Aspects of the present invention provide variations in the design of the first adjustable measurement member 104 and the second adjustable measurement member 106 that can each be used to provide accurate pupil height measurements. Further, aspects of the present invention provide variations in the design and use of the pupillary alignment reference areas of the first and second adjustable measurement members 104 and 106.

Figure 5:
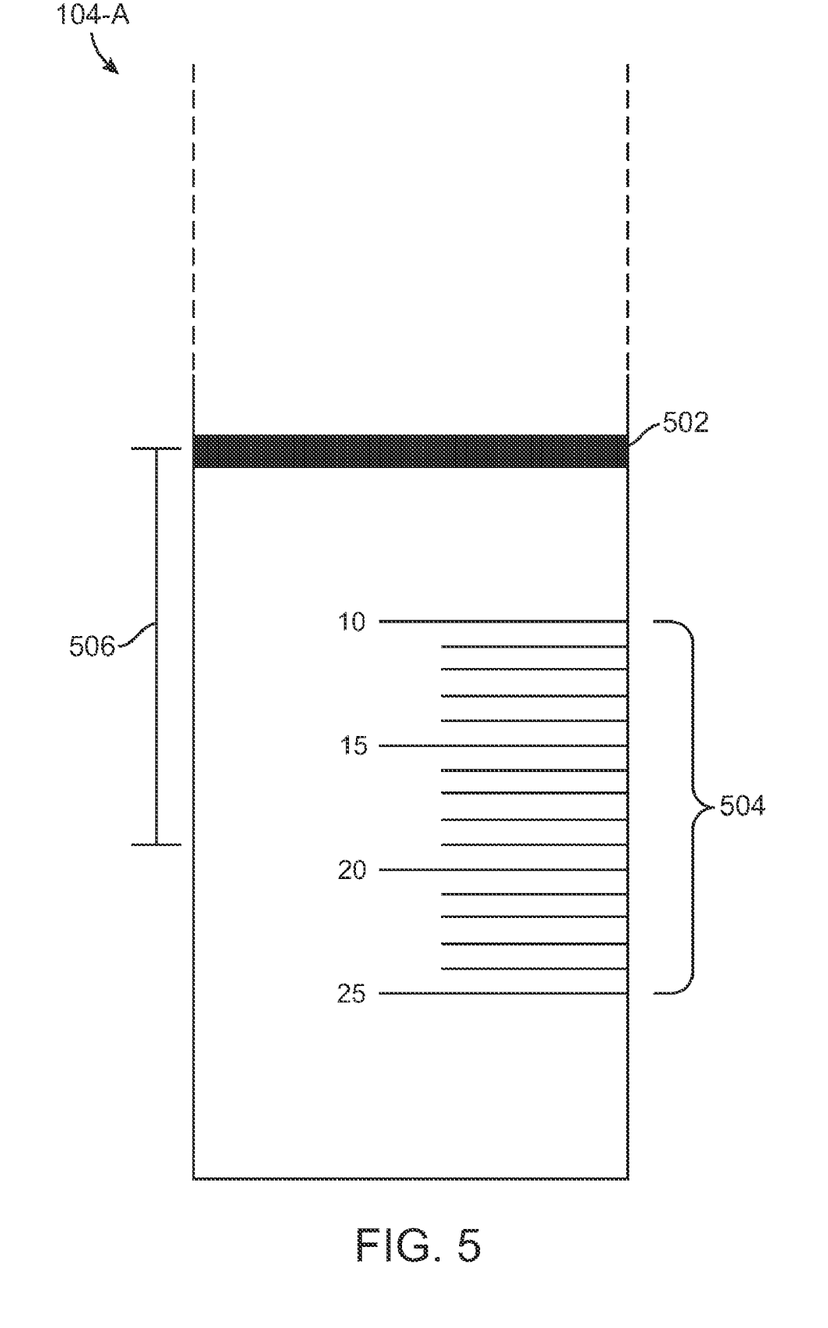
FIG. 5 illustrates a lower portion of a first exemplary version of a first adjustable measurement member depicted in FIG. 1.

FIG. 5 illustrates a lower portion of a first exemplary version of the first adjustable measurement member 104-A. As shown in FIG. 5, the first adjustable measurement member 104-A can comprise a pupillary alignment reference area that is a line 502. The pupillary alignment line 502 can be a dark or opaque line (or blurred or otherwise vision obscuring region) that the patient cannot see through when the pupillary alignment line 502 is substantially aligned with the patient's pupil and/or line of sight (or can see substantially less clearly through in comparison to the other portions of the first adjustable measurement member 104-A). The remaining portion of the first adjustable measurement member 104-A can be transparent (i.e., the portion of the first adjustable measurement member 104-A above and below the pupillary alignment line 502). The pupillary alignment line 502 can be of any width or height. As an example, the pupillary alignment line 502 can have a height of 5 mm or less and can be as wide as the width of the first adjustable measurement member 104-A.

A measurement guide 504 can be positioned below the pupillary alignment line 502. The measurement guide 504 can comprise a scale measuring distance below the pupillary alignment line 502 relative to the pupillary alignment line 502. When the pupillary alignment line 502 is positioned substantially in front of the pupil of the patient (or in front of the patient's line of sight), then a portion of the measurement guide 504 can be aligned with a bottom of the eyeglasses worn by the patient. Accordingly, a distance 506 can be measured that is substantially equal to the distance between the patient's pupil (and/or line of sight) and the bottom of the patient's eyeglasses (i.e., either the bottom of the eyeglass frames or the bottom of the lenses of the eyeglasses if the frame does not include a lower eye wire portion).

The pupillary alignment line 502 can be positioned substantially in front of the pupil of the patient by adjusting the vertical position of the first adjustable measurement member 104-A relative to the base member 102. Specifically, the position of the first adjustable measurement member 104-A can be adjusted until the pupillary alignment line 502 substantially blocks or minimizes the patient's vision or line of sight. The position of the first adjustable measurement member 104-A can be adjusted by the patient and/or by another person conducting or aiding the pupil height measurement (e.g., by an administrator of the pupil height measurement). Pupil height can be measured for each pupil independently and separately. The eye of the patient not being measured for pupil height can be occluded when the measurement related to the patient's other eye is taking place.

A patient can determine when the pupillary alignment line 502 substantially blocks her vision or line of sight by providing subjective feedback to an administrator of the pupil height measurement. The administrator may also adjust the pupillary alignment line 502, moving it into a position that is approximately aligned with the center of the patient's pupil or line of sight.

Alternatively, or in addition thereto, the administrator of the pupil height measurement can use a local light source (e.g., a pen light) to determine when a reflection from the patient is substantially blocked or minimized by the pupillary alignment line 502. That is, the patient's pupil can be exposed to a light source such that it provides a reflection. When the light source is at approximately the same height as the patient's eyes or pupil, and the administrator's eyes are also at the same approximate height as patient's eyes, the reflection observed by the administrator will be at the apex of the cornea, indicating the line of sight of the patient. Once the pupillary alignment line 502 is positioned to substantially block, minimize, or align to the approximate center of the reflection from the patient's eye, the pupillary alignment line 502 can be considered to be substantially aligned with the center of the patient's pupil and/or the patient's line of sight. The local light source can then be replaced with a remote or target light source to maintain the patient's head position and line of sight during the pupil height measurement. Alternatively, the same light source may continue to be used for this purpose.

The measurement guide 504 can comprise a scale of any length and any number of divisions (including any measurement system—e.g., metric or English measurement units). In general, the measurement guide 504 can comprise any guide that allows quick and efficient measurement of the distance 506 from the pupillary alignment line 502 to the portion of the first adjustable measurement member 104-A that is substantially aligned with the bottom of the eyeglasses worn by the patient.

As an alternative to the measurement guide 504, or in addition thereto, the multifocal measurement device 100 can include an electronic display. The electronic display can be used to provide a visual display of the measurement 506 as the measurement is being made (i.e., as the adjustable measurement members 104 and 106 are being moved). The multifocal measurement device 100 can include a separate display for each of the adjustable measurement members 104 and 106 or can share a display. When the display is shared by each of the adjustable measurement members 104 and 106, then a toggle switch of the multifocal measurement device 100 can be used to switch the display between measurements being made by adjusting the position of the first adjustable measurement member 104 and the second adjustable measurement member 106. Aspects of the present invention include other means for visually displaying measurement information as will be appreciated by one skilled in the pertinent art.

Figure 6:
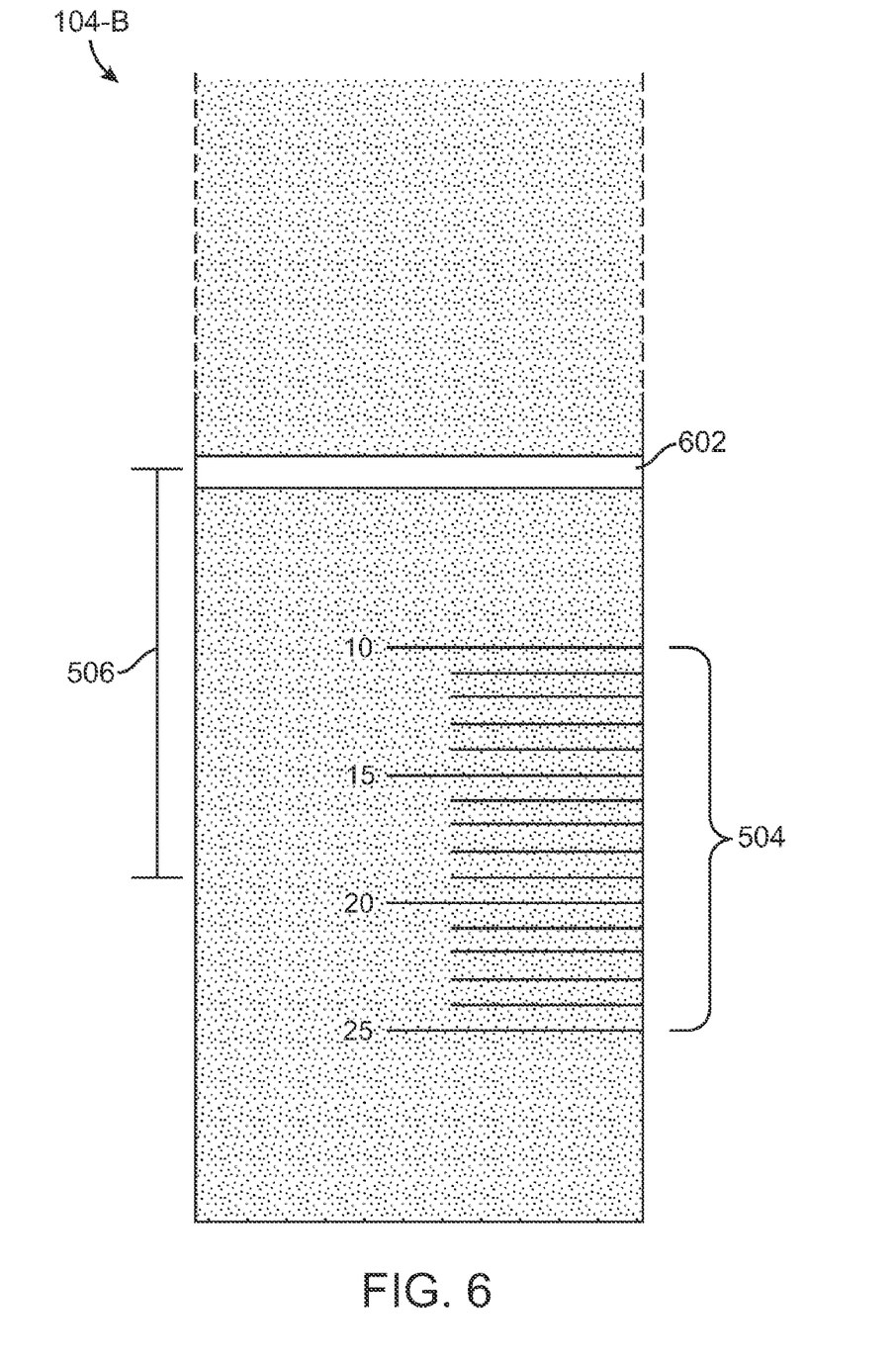
FIG. 6 illustrates a lower portion of a second exemplary version of the first adjustable measurement member depicted in FIG. 1.

FIG. 6 illustrates a lower portion of a second exemplary version of the first adjustable measurement member 104-B. In contrast to an opaque or dark alignment line, the first adjustable measurement member 104-B can comprise a pupillary alignment reference area that comprises a transparent pupillary alignment slit or line 602. The pupillary alignment line 602 can be of any width or height. As an example, the pupillary alignment line 602 can have a height of 5 mm or less and can be as wide as the width of the first adjustable measurement member 104-B. The area of the first adjustable measurement member 104-B above and below the pupillary alignment line 602 can be opaque. Accordingly, a patient's vision can be blocked when looking through any part of the first adjustable measurement member 104-B other than the pupillary alignment line 602. When the patient's vision is substantially maximized when looking through the pupillary alignment line 602, an accurate measurement of the patient's pupil height can be made.

Maximization of the patient's vision through the pupillary alignment line 602 can be determined based on patient feedback. Alternatively, or in addition thereto, an administrator of the pupil height measurement can use a light source (e.g., a pen light) to determine when a reflection from the patient is substantially maximized when passing through the pupillary alignment line 602. That is, the patient's pupil can be exposed to a light source such that it provides a reflection indicating vision is not interrupted. Once the pupillary alignment line 602 is positioned to allow a substantially maximized reflection from the patient's eye, the pupillary alignment line 602 can be considered to be substantially aligned with the patient's pupil.

As shown in FIG. 6, the first adjustable measurement member 104-B can also include the measurement guide 504. Once the pupillary alignment line 602 is substantially aligned with the patient's pupil, the distance 506 between the patient's pupil and the bottom of the patient's eyeglasses can be accurately measured.

Two small holes can be positioned on the ends of the pupillary alignment reference areas of the exemplary first adjustable measurement members 104-A and 104-C. That is, two small holes can be positioned on the ends of the pupillary alignment line 502 and the pupillary alignment slit or line 602. The holes can be used to mark the position of these lines when positioned substantially in front of a patient's pupil. Specifically, the holes can allow marks to be made on the patient's lens such that a line can later be drawn on the lens representing the position of either the pupillary alignment line 502 or the pupillary alignment line 602. The line connecting the marks made through the holes can then be used to make a pupil height measurement to the bottom of the eyeglass frame or lens.

Figure 7:
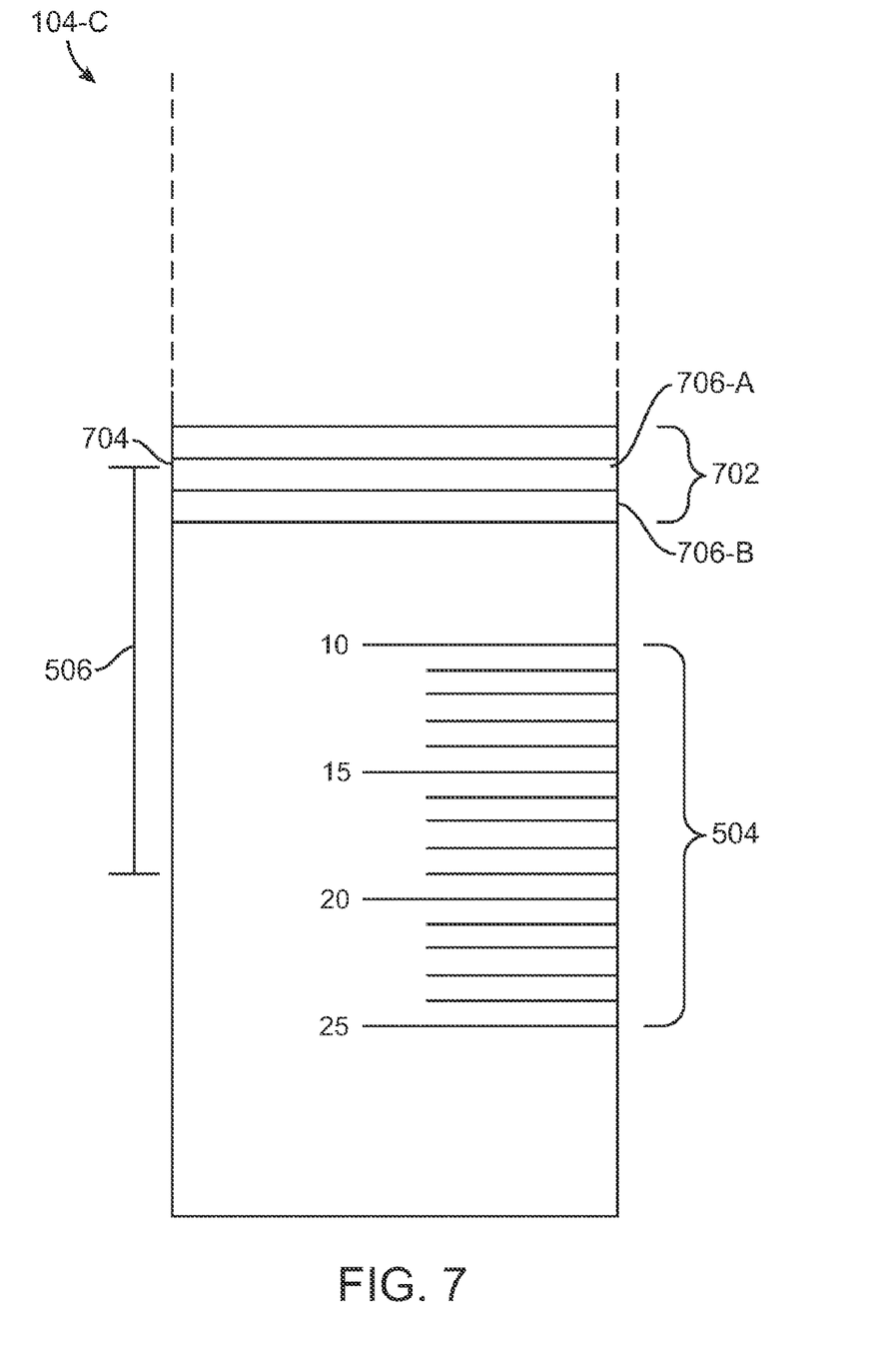
FIG. 7 illustrates a lower portion of a third exemplary version of the first adjustable measurement member depicted in FIG. 1.

FIG. 7 illustrates a lower portion of a third exemplary version of the first adjustable measurement member 104-C. The first adjustable measurement member 104-C can comprise a pupillary alignment reference area that is a prismatic optical element 702. The prism 702 can be of any design including, but not limited to, a three component design. As an example, the prism 702 can comprise a flat section 704, an upper section 706-A, and a lower section 706-B. The upper section 706-A can be angled or sloped towards the first adjustable measurement member 104-C relative to the flat section 704. The upper section 706-A can be adjacent to a top portion of the flat section 704. The lower section 706-B can also be angled or sloped towards the first adjustable measurement member 104-C relative to the flat section 704. The lower section 706-B can be adjacent to a bottom portion of the flat section 704. The flat section 704, as an example, can have a vertical height of 5 mm or less. The upper and lower sections 706-A and 706-B can slope away from the upper section 704 at approximately ten degrees for example.

When looking through the flat section 704 at a remote target, the patient can see three images of the target object. A first image of the target object can be seen because of the flat section 704. A second image of the target object can be seen above the first image as a result of the upper section 706-A. A third image of the target object can be seen below the first image as a result of the lower section 706-C. All three images can be seen simultaneously by the patient when the flat section 704 is substantially aligned with the patient's pupil. Accordingly, when three images are seen by the patient, an accurate measurement of pupil height can be made. Accuracy can be improved as the flat section 704 is aligned with the patient's pupil to substantially maximize the clarity of the multiple images formed by the prism 702.

If fewer than three simultaneous images are seen by the patient (or if their clarity is not substantially maximized) when looking at a target object, then the flat section 704 can be considered to not be substantially aligned with the pupil of the patient. The patient and/or the administrator of the pupil measurement can adjust the positioning of the first adjustable measurement member 104-C until the patient observes three images of the target object (or substantially maximizes the clarity of the formed images). If fewer than three images are seen, then further adjustment of the positioning of the first adjustable measurement member 104-C may be needed before an accurate pupil height measurement can be made.

The depictions and descriptions above for the first adjustable measurement members 104-A, 104-B and 104-C are applicable to the design and operation of the second adjustable measurement member 106. Generally, the design and use of the first adjustable measurement member 104 will be the same for the second adjustable measurement member 106.

Figure 8:
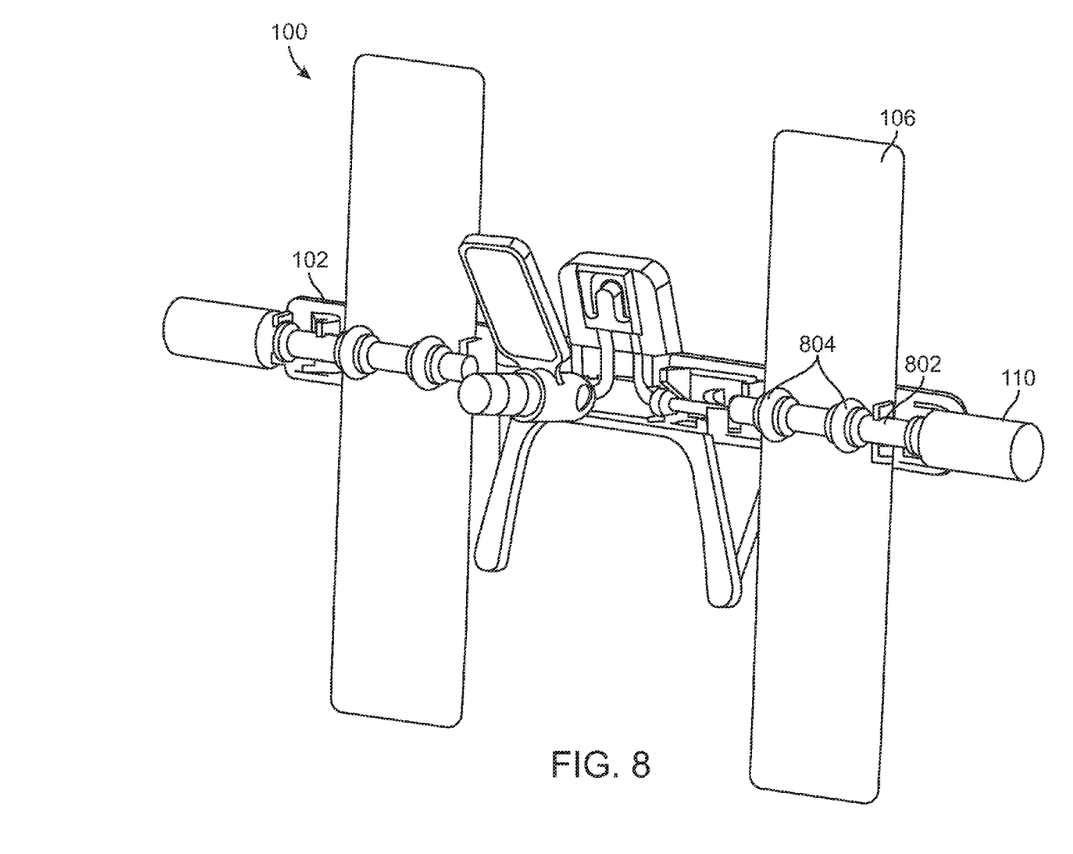
FIG. 8 illustrates a mechanism for adjusting the positioning of the adjustable measurement members depicted in FIG. 1 in accordance with an aspect of the present invention.

FIG. 8 illustrates a mechanism for adjusting the positioning of the adjustable measurement members 104 and 106 in accordance with an aspect of the present invention. Below, the mechanism of FIG. 8 is described in relation to the second adjustable measurement member 106 for simplicity and is applicable to the first adjustable measurement member 104.

As shown in FIG. 8, a cross sectional view of the base member 102 is shown. Internal to the base member 102 and connected to the second adjustment knob 110 can be a shaft 802. The shaft 802 can be connected, attached, or coupled to one or more wheels or rollers 804. The rollers 804 can be positioned to be in close contact with the second adjustable measurement member 106.

The rollers 804 can be positioned to apply pressure against a portion of the second adjustable measurement member 106 that is in direct contact with the rollers 804. In this way, the second adjustable measurement member 106 can be held in a stable position when desired (e.g., when the second knob 110 is not turned). Further, by turning the second adjustment knob 110, the second adjustable measurement member 106 can be moved by having the shaft 802 turn the one or more rollers 804 which, as a result, move the second adjustable measurement member 106.

As an alternative to using the one or more rollers 804, one or more gears could be connected to the shaft 802 and interlocked with regions of the second adjustable measurement member 106 (e.g., divots or notches) to enable stability and movement of the second adjustable measurement member 106. As an additional alternative, a push button rather than the second adjustment knob 110 can be used to regulate the positioning of the second adjustable measurement member 106. For example, when engaged, the push button can release a locking mechanism for stabilizing the second adjustable measurement member 106. As a result, the second adjustable measurement member 106 can be moved (e.g., by hand). When released, the push button can cause the locking mechanism to be re-engaged such that the second adjustable measurement member 106 is substantially stabilized.

According to an aspect of the present invention, the multifocal measurement device 100 can comprise a device for tracking and recording the head position of a patient wearing or using the multifocal measurement device 100. Specifically, the multifocal measurement device 100 can include a gyroscope or accelerometer for detecting the angle of tilt of the multifocal measurement device 100 (and therefore the head position of a patient wearing eyeglasses to which the multifocal measurement device 100 is attached). The gyroscope or accelerometer can be coupled to a memory device capable of recording or storing the tilt or angle of the multifocal measurement device 100. The gyroscope or accelerometer and associated memory storage device can be positioned internal to the base member 102. The multifocal measurement device 100 can further include a wireless or wired link to allow downloading of recorded or electronically stored head position data.

The stored head position data of a patient can be used to determine a "normal" or "typical" head position or head tilt of the patient. Determining this typical head position of the patient, and using it when conducting the pupil height measurement, can ensure accurate pupil height measurements in contrast to measurements made when the patient's head is held in a non-typical manner for the measurement.

As an example, to ensure accurate measurements, a patient can wear the multifocal measurement device 100 in a number of situations (e.g., sitting and walking) for a desired period of time. Head positioning data can be tracked and recorded. Based on the stored data, an average or typical head posture of the patient can be determined. Once the average head tilt of a user is determined, the patient can be asked to maintain the average head tilt during the pupil height measurement.

A light emitting diode (LED) or other signaling device can be used to indicate when the average head tilt of the patient is obtained. For example, the multifocal measurement device 100 can have a first mode of operation during which the device is capable of recording the instantaneous head tilt of a patient. During a second mode of operation, after an average head tilt is determined, the LED can signal when the determined head tilt positioned is obtained (e.g., by turning on or off, changing colors, or flashing). The patient can be asked to maintain this positioning during the pupil height measurement.

The average head tilt of the patient can also be "recorded" using the level indicator 118. That is, after the average head tilt of the patient is determined, the level indicator 118 can be adjusted to be level when the patient's head is held in the average head tilt position (e.g., level or horizontal with respect to the floor). During the pupil height measurement, the level indicator 118 can then be checked to make sure it is level to indicate and ensure that the patient's head is maintained in the average head tilt position as the pupil height measurement is conducted.

The LED or other signaling device can alternatively signal when a predetermined head tilt position other than an average head tilt position is obtained. For example, the LED or other device can signal when a patient's head is tilted at approximately 90 degrees from horizontal. Accordingly, a pupil height measurement can be administered using a fixed, predetermined head tilt position.

Figure 9:
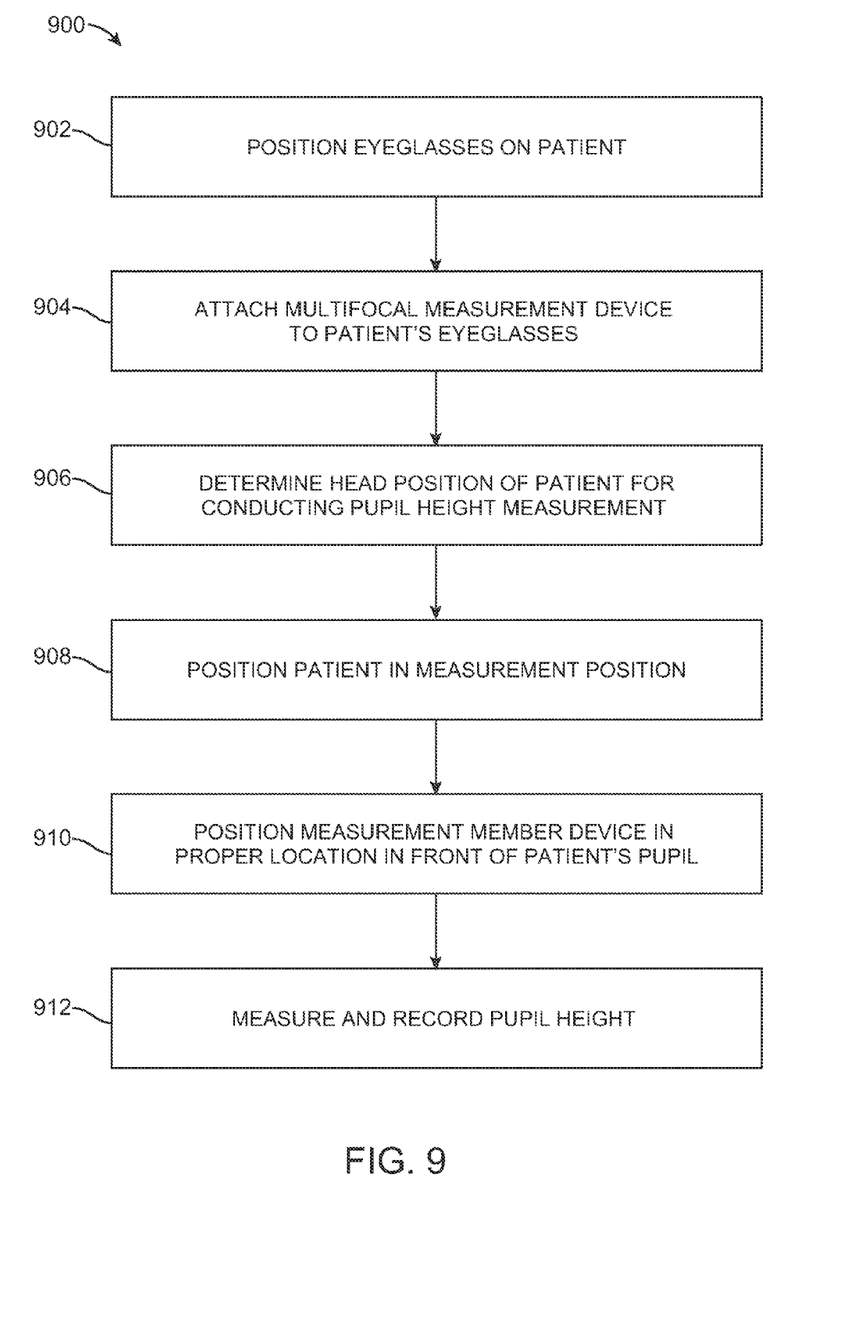
FIG. 9 provides a flowchart that illustrates operational steps for conducting a pupil height or fitting height measurement using a multifocal measurement device of the present invention.

FIG. 9 provides a flowchart 900 that illustrates operational steps for conducting a pupil height or fitting height measurement using a multifocal measurement device of the present invention. The invention is not limited to this operational description. Rather, it will be apparent to persons skilled in the relevant art(s) from the teachings herein that other operational control flows are within the scope and spirit of the present invention. In the following discussion, the steps in FIG. 9 are described.

As shown in FIG. 9, at step 902, eyeglasses can be positioned onto a patient. The eyeglasses can be an eyeglass frame for which the patient desires to be fitted. The eyeglass frame can be of any type, style or size. The eyeglasses can be a fully-rimmed, a partially-rimmed or a rimless eyeglass frame. The eyeglasses can house lenses or can be devoid of lenses (i.e., the frame only without any lenses). The eyeglasses can be placed and worn on the patient in a manner that the patient normally or typically wears or will wear the eyeglasses.

At step 904, a multifocal measurement device of the present invention (e.g., the multifocal measurement device 100) can be attached to the eyeglass frame worn by the patient. The multifocal measurement device can be, for example, clamped onto the patient's eyeglasses. The multifocal measurement device can be positioned across the top of the patient's eyeglass frames. The multifocal measurement device can be positioned to be flush against the top of the patient's eyeglasses so that the multifocal measurement device is substantially level and not attached at an angle.

At step 906, a desired head position of the patient can be determined. The desired head position of the patient can be the head position of the patient that is desired when conducting the pupil height measurement (e.g., a desired measurement head position). In general, the desired measurement head position can be the head position of the patient when the patient uses the far distance viewing portion of the patient's eyeglasses. For example, the desired measurement head position can be the typical or normal head position of the patient when looking at a remote object position directly in front of the patient (e.g., a head position used for the patient's typical line of sight when viewing a distant object corresponding the patient's eyes looking straight ahead and not slightly down or up).

The desired measurement head position of the patient can be determined a number of ways. The desired measurement head position can be determined subjectively or objectively. As an example, the desired measurement head position can simply be determined by the patient—that is, by asking the patient to simply position their head and gaze as the patient normally or typically would. As another example, the administrator of the pupil height measurement can specify a particular head position to use for conducting the pupil height measurement. The specified head position can be, for example, a head position that is approximately parallel or 90 degrees relative to the ground.

The desired measurement head position can also be determined by tracking and recording the head position of a user over a period of time and/or as the patient engages in a number of different activities as described above. Recorded measurements of head position can be used to determine a normal or typical (e.g., average) head position that can serve as the desired measurement head position of the patient for conducting the pupil height measurement.

The desired measurement head position of the patient can also be determined by having the patient focus on a remote target object. The target object can be positioned such that the patient will view the object through the distance viewing portion of the patient's eyeglasses.

After determining a desired head position of the patient, the determined head position can be "recorded." Recording the desired head position can ensure that the patient can return to the desired position at any time (e.g., when the pupil height measurement is about to be taken). This allows for any head position changes between the time a desired positioning is determined and the time during which the pupil height measurement is being taken.

The desired head position of the patient can be recorded using a position indicating device such as a bubble level indicator (e.g., the level indicator 118). For example, the bubble level indicator can be adjusted to be level when a desired head position is determined. Subsequently, during the pupil height measurement, the bubble level can be checked to confirm that it is level to ensure the measurement is conducted when the patient is in the proper position.

At step 908, the patient can be placed into a position for making the pupil height measurement. The measurement position of the patient can be the patient sitting or standing. There are a number of methods to ensure that the head position substantially matches the desired head position of the patient determined in step 906. The method selected to ensure the measurement head position of the patient matches the desired head position can correspond to the method and means for determining the desired head position of the patient.

For example, if the desired head position is determined by tracking and recording the patient's head position using an accelerometer and gyroscope, then an indicator on the multifocal measurement device (e.g., an LED) can be programmed to indicate (e.g., by illuminating, turning off, or switching colors) when the desired head position is achieved. Accordingly, as the patient is placed into a measurement position—for example, sitting down—the patient's head can be moved until the desired head position is obtained. The desired head position determined using this data collection method can also be recorded using a bubble level indicator to "record" the desired position in step 906.

As an additional example, if the desired head position of the patient is determined by using a bubble level indicator based on observation of the patient and/or subjective positioning of the patient, then the bubble level indicator can be used to ensure the desired positioning is maintained during the pupil height measurement. Further, if a specified head position is desired that is independent of other patient considerations, then the head position can be ensured using a bubble level indicator or a gyroscope or accelerometer. That is, both the bubble level indicator and gyroscope or accelerometer (in conjunction with an output signal device) can be adjusted to implement a specific head tilt as described above.

As the patient is maneuvered into measurement position, a pen light or other light source or target can be used to ensure the patient's gaze is substantially the patient's typical line of sight when looking straight ahead. That is, a light source or target can be used to ensure the patient is looking directly ahead and not looking slightly down or up.

At step 910, a measurement member (e.g., one of the adjustable measurement members 104 and 106) of the multifocal measurement device can be placed into proper position. Specifically, the position of the measurement member can be adjusted to place the pupillary alignment reference area substantially in front of the patient's pupil. For example, the measurement member can be positioned to substantially block or minimize the line of sight of the patient (e.g., using the first exemplary adjustable measurement member 104-A), to enable or substantially maximize distance vision of the patient (e.g., using the second exemplary adjustable measurement member 104-C) or to enable or substantially maximize observation of the proper prismatic images (e.g., using the third exemplary adjustable measurement member 104-C).

Each of the above described measurement members and techniques enable the approximate middle of the patient's pupil to be determined and recorded using either a transparent line or slit, an opaque line, or a prismatic optical element. During or at the conclusion of step 910, the patient's pupil can be considered to be approximately aligned with a pupillary alignment reference area of the multifocal measurement device of the present invention, thereby allowing a pupil height measurement to be quickly ascertained.

At step 912, the pupil height of the patient can be measured and recorded. The pupil height measurement can be made by simply determining the distance between the pupillary alignment reference area of the multifocal measurement device and a bottom of the eyeglass frames worn by the patient. A measurement guide included on the adjustable measurement guide can facilitate a quick determination of this distance. After step 912, steps 910 and 912 can be repeated for the patient's other eye.

CONCLUSION

While various, embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A multifocal measuring device, comprising:
   a base member;
   at least one of: a bubble level, an accelerometer, and a gyroscope;
   a first adjustable measurement member connected to the base member and oriented substantially perpendicular to the base member;
   a first knob protruding from a first end of the base member to adjust a vertical positioning of the first adjustable measurement member relative to the base member;
   a second adjustable measurement member connected to the base member and oriented substantially perpendicular to the base member and substantially parallel to the first adjustable measurement member; and
   a second knob protruding from a second end of the base member to adjust a vertical positioning of the second adjustable measurement member relative to the base member,
   wherein the first adjustable measurement member comprises a first pupillary alignment reference area that can be positioned substantially in front of a first pupil of an individual by adjusting the first knob and wherein the second adjustable measurement member comprises a second pupillary alignment reference area that can be positioned substantially in front of a second pupil of the individual by adjusting the second knob.

2. The multifocal measurement device of claim 1, wherein the first adjustable measurement member above and below the first pupillary alignment reference area is opaque and the second adjustable measurement member above and below the second pupillary alignment reference area is opaque.

3. The multifocal measurement device of claim 2, wherein the first pupillary alignment reference area is a first transparent line and the second pupillary alignment reference area is a second transparent line.

4. The multifocal measurement device of claim 1, wherein the first adjustable measurement member above and below the first pupillary alignment reference area is transparent and the second adjustable measurement member above and below the second pupillary alignment reference area is transparent.

5. The multifocal measurement device of claim 4, wherein the first pupillary alignment reference area is a first opaque line and the second pupillary alignment reference area is a second opaque line.

6. The multifocal measurement device of claim 1, wherein the first pupillary alignment reference area and the second pupillary alignment reference area each comprises a prism.

7. The multifocal measurement device of claim 6, wherein each prism of the first and second pupillary alignment reference areas comprises a flat middle section, an upper sloped section adjacent to a top of the flat middle section, and a lower sloped section adjacent to a bottom of the flat middle section.

8. The multifocal measurement device of claim 1, wherein the first adjustable measurement member and the second adjustable measurement member each further comprises a measurement guide for measuring pupil height as a distance from the pupillary alignment reference area to a position on the measurement guide substantially aligned with a bottom of eyeglass frames worn by the individual.

9. The multifocal measurement device of claim 1, further comprising a bubble level.

10. The multifocal measurement device of claim 9, further comprising a mirror positioned above the bubble level.

11. The multifocal measurement device of claim 1, wherein any one of the bubble level, the accelerometer and the gyroscope is used for determining an angle of tilt of the multifocal measurement device.

12. The multifocal measurement device of claim 11, wherein the multifocal device comprises at least one of an accelerometer and a gyroscope, further comprising a memory device coupled to one of the accelerometer and the gyroscope for storing the angle of tilt of the multifocal measurement device.

13. The multifocal measurement device of claim 1, further comprising immobile front frame grips connected to a bottom of the base member and adjustable back frame grips connected to a back of the base member.

14. The multifocal measurement device of claim 13, further comprising an actuator connected to a top of the base member for moving the adjustable back frame grips.

15. A method for measuring a pupil height of an individual, comprising:
    positioning eyeglasses on the individual;
    attaching a multifocal measurement device across a top of the eyeglasses, the multifocal measurement device comprising an adjustable vertical member, the adjustable vertical member comprising a pupillary alignment reference area;
    determining a measurement head position of the patient using any one of a bubble level, a gyroscope, and an accelerometer connected to the multifocal measurement;
    adjusting a vertical position of the adjustable vertical member to position the pupillary reference alignment area substantially in front of a pupil of the individual;
    measuring a distance between the pupillary reference alignment area and a bottom of the eyeglasses.

16. The method of claim 15, wherein attaching further comprises clamping the multifocal measurement device onto the eyeglasses.

17. The method of claim 15, wherein determining further comprises observing a head position of the individual when the individual views a remote target.

18. The method of claim 17, wherein determining further comprises adjusting a bubble level connected to the multifocal measurement device to indicate the head position.

19. The method of claim 15, wherein adjusting further comprises turning a knob connected to the multifocal measurement device.

20. The method of claim 15, wherein the pupillary reference alignment area comprises an opaque line and adjusting further comprises substantially blocking a line of sight of the individual.

21. The method of claim 15, wherein the pupillary reference alignment area comprises a transparent line and adjusting further comprises substantially maximizing a line of sight of the individual.

22. The method of claim 15, wherein the pupillary reference alignment area comprises a prism and adjusting further comprises substantially maximizing observation by the individual of multiple images of a remote object formed by the prism.

23. The method of claim 15, wherein the adjustable vertical member comprises a measurement guide and measuring further comprises determining a position on the measurement guide that is substantially aligned with a bottom of eyeglasses.

24. The method of claim 15, wherein adjusting further comprises positioning the pupillary reference alignment area substantially in front of a center of the pupil of the individual.

25. The method of claim 15, wherein adjusting further comprises positioning the pupillary reference alignment area substantially in front of a line of sight of the individual.

26. An ophthalmic measuring device for locating a reference point positioned within a pupil of a first eye of an individual, comprising:
    means for attaching the ophthalmic measuring device to an eyeglass frame worn by the individual;
    at least one of: a bubble level, an accelerometer, and a gyroscope; and
    a first moveable member positioned in front of the first eye for measuring a distance from the reference point to a bottom of an eyeglass rim of the eyeglass frame worn by the individual, the moveable member comprising a scale for measuring the distance.

27. The ophthalmic device of claim 26, further comprising a second moveable member positioned in front of a second eye of the individual, wherein the first and second moveable members can be moved independently.

28. A multifocal measuring device, comprising:
    a base member;
    at least one of: a bubble level, an accelerometer, and a gyroscope;
    a first adjustable measurement member connected to the base member and oriented substantially perpendicular to the base member; and
    a second adjustable measurement member connected to the base member and oriented substantially perpendicular to the base member and substantially parallel to the first adjustable measurement member,
    wherein the first adjustable measurement member comprises a first pupillary alignment reference area that can be positioned substantially in front of a first pupil of an individual and wherein the second adjustable measurement member comprises a second pupillary alignment reference area that can be positioned substantially in front of a second pupil of the individual.

* * * * *